United States Patent
Kurata et al.

(10) Patent No.: US 8,165,874 B2
(45) Date of Patent: Apr. 24, 2012

(54) SYSTEM, METHOD, AND PROGRAM PRODUCT FOR PROCESSING SPEECH RATIO DIFFERENCE DATA VARIATIONS IN A CONVERSATION BETWEEN TWO PERSONS

(75) Inventors: Gakuto Kurata, Yamato (JP);
Masafumi Nishimura, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 641 days.

(21) Appl. No.: 12/399,560

(22) Filed: Mar. 6, 2009

(65) Prior Publication Data
US 2009/0228268 A1 Sep. 10, 2009

(30) Foreign Application Priority Data
Mar. 7, 2008 (JP) .................................. 2008-58745

(51) Int. Cl.
*G10L 11/02* (2006.01)
(52) U.S. Cl. ......... 704/233; 704/210; 704/215; 704/224
(58) Field of Classification Search .................. None
See application file for complete search history.

(56) References Cited

U.S. PATENT DOCUMENTS

| | | | | |
|---|---|---|---|---|
| 5,737,405 A * | 4/1998 | Dezonno | .................. | 379/265.07 |
| 5,854,832 A * | 12/1998 | Dezonno | .................. | 379/265.07 |
| 6,363,145 B1 * | 3/2002 | Shaffer et al. | ............ | 379/265.02 |
| 7,627,105 B2 * | 12/2009 | Lankes | ..................... | 379/210.02 |
| 7,869,586 B2 * | 1/2011 | Conway et al. | .......... | 379/265.06 |
| 7,881,234 B2 * | 2/2011 | Abernethy et al. | ........... | 370/260 |
| 7,995,717 B2 * | 8/2011 | Conway et al. | ............ | 379/88.16 |

FOREIGN PATENT DOCUMENTS

| | | |
|---|---|---|
| JP | 2002051153 A2 | 2/2002 |
| JP | 2006267465 A2 | 10/2006 |
| JP | 2007033754 A2 | 2/2007 |

OTHER PUBLICATIONS

Etienne Marcheret et al., "The IBM RT06s Evaluation System for Speech Activity Detection in CHIL Seminars," In Proc. MLMI, Springer Berlin/Heidelbelg, 2006.

* cited by examiner

*Primary Examiner* — Talivaldis Ivars Smits
(74) *Attorney, Agent, or Firm* — Vazken Alexanian

(57) ABSTRACT

A system, method, and program product for processing voice data in a conversation between two persons to determine characteristic conversation patterns. The system includes: a variation calculator for calculating a variation of a speech ratio of a first speaker and a variation calculator for calculating a variation of a speech ratio of a second speaker; a difference calculator for calculating a difference data string; a smoother for generating a smoothed difference data string; and a presenter for presenting the difference between the variation of the speech ratio of the first speaker and the speech ratio of the second speaker. The method includes: calculating a variation of a speech ratio of a first speaker and a second speaker; calculating a difference data string; generating a smoothed difference data string; and grouping them according to their patterns.

14 Claims, 15 Drawing Sheets

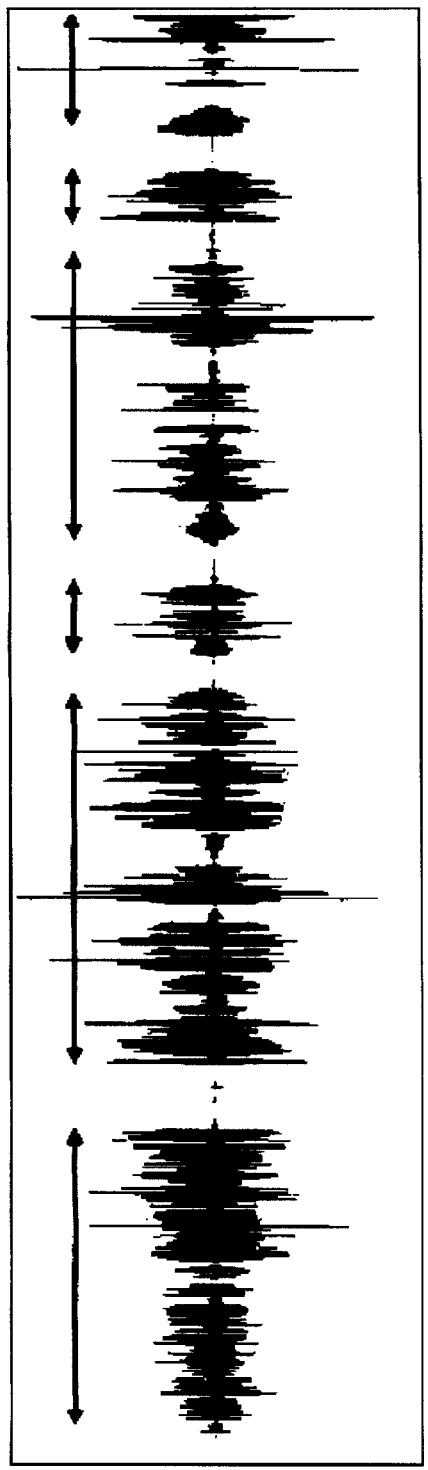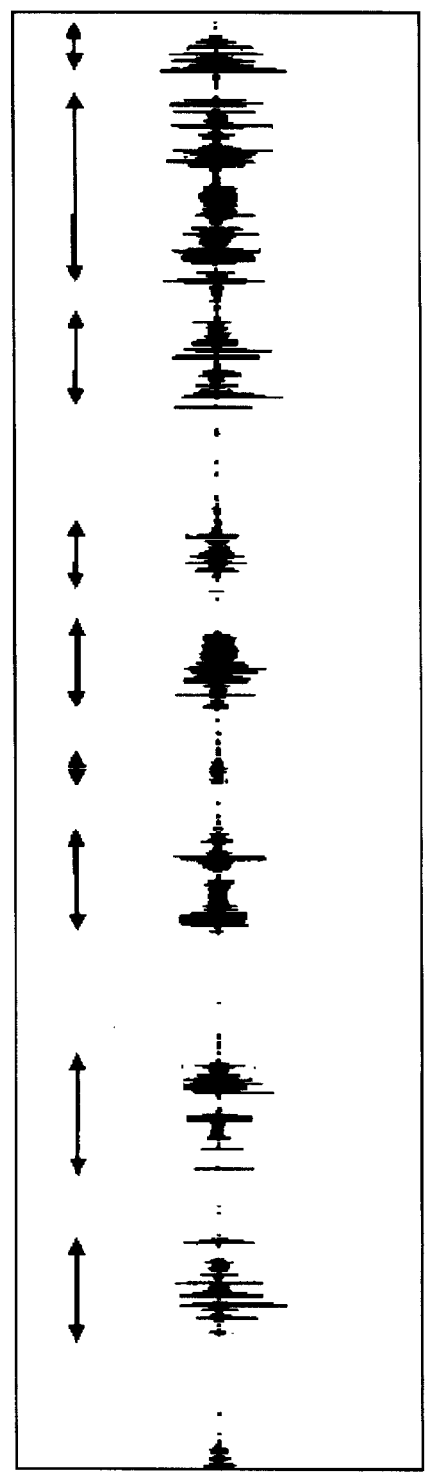

| NUMBER OF CONVERSATIONS | PATTERN | | | | | | |
|---|---|---|---|---|---|---|---|
| 13 | 1 | | | | | | |
| 8 | 0 | | | | | | |
| 4 | 1 | 0 | 1 | | | | |
| 4 | 1 | 0 | | | | | |
| 3 | 1 | 0 | 1 | 0 | | | |
| 3 | 0 | 1 | | | | | |
| 3 | -1 | | | | | | |
| 2 | 0 | -1 | | | | | |
| 1 | 1 | 0 | 1 | 0 | 1 | | |
| 1 | 1 | -1 | 1 | 0 | -1 | | |
| 1 | 1 | -1 | 0 | -1 | 0 | 1 | |
| 1 | 0 | 1 | 0 | 1 | | | |
| 1 | 0 | -1 | 0 | 1 | | | |
| 1 | 0 | -1 | 0 | -1 | 0 | -1 | 0 |
| 1 | 0 | -1 | 0 | -1 | 0 | -1 | |
| 1 | 0 | -1 | 0 | -1 | | | |
| 1 | -1 | 0 | -1 | | | | |
| 1 | -1 | 0 | | | | | |

WINDOW START TIME: VOICE DATA SEQUENCE

0msec. : 0, 100, 80, 30, -120, -100, 30, 40, 89, 21, -1, ···
20msec. : 10, 34, 23, -10, 19, -21, ···
40msec. : 20, 40, -2, 10, 49, -2, ···
.
.
.

(C)

WINDOW START TIME: POWER

0msec. : 24304
20msec. : 345397
40msec. : 133391
.
.
.

(D)

START TIME AND END TIME OF EACH SPEECH PERIOD

START TIME – END TIME
20msec. : 800msec.
1020sec.m : 2800sec.m
.
.
.

FIG. 15

SYSTEM, METHOD, AND PROGRAM PRODUCT FOR PROCESSING SPEECH RATIO DIFFERENCE DATA VARIATIONS IN A CONVERSATION BETWEEN TWO PERSONS

CROSS-REFERENCE TO RELATED APPLICATION

This application claims priority under 35 U.S.C. §119 from Japanese Patent Application No. 2008-58745 filed on Mar. 7, 2008, the entire contents of which are incorporated herein by reference.

BACKGROUND OF THE INVENTION

1. Field of the Invention

The present invention relates to a system, a method, and a program for processing voice data for a conversation between two persons. For example, the present invention relates to a system, a method, and a program for classifying a conversation between an agent and a customer at a call center.

2. Description of Related Art

At a call center, multi-person or two-way conversations occur over the phone between a call center agent (referred to as an agent) and a customer. A supervisor of the call center extracts conversations, including characteristic dialogues from the multi-person conversations, in order to improve customer services. Examples include a conversation in which the customer becomes angry or a conversation in which the agent makes an improper statement.

As an example, the supervisor of the call center can record the speakers' voices (referred to as voice, voices, or voice data) in a conversation between the agent and the customer in order to listen to the recorded voices, enabling the extraction of the conversation including the characteristic dialogue. Further, as another example, the supervisor of the call center can use a speech recognizer to convert voices in a conversation to text and read the converted text, enabling the extraction of the conversation including the characteristic dialogue.

However, large volumes of conversations occur at the call center. Therefore, it is difficult for the supervisor of the call center to listen to all the voices in many recorded conversations. Further, speech recognizers do not work accurately on voice over a phone as well as on non-phone conversations. Thus, it is difficult for the supervisor of the call center to have the speech recognizer convert all the voices in all the conversations to text with precision.

As mentioned above, it is very difficult to confirm all the conversations by either listening to the recorded voice or reading the text recognized by speech recognition. Thus, a conversation having a high probability of including a characteristic dialogue cannot easily be extracted from all the conversations at the call center.

As a method of analyzing a conversation between an agent at the call center and a customer without using speech recognition, techniques described, for example, in Patent Documents 1 to 3 are known. In Patent Document 1, a technique is described for setting a flag when the ratio of a voice period of time and a non-voice period of time between an operator and a customer is larger than a predetermined value (paragraph [0058]). According to this technique, if the ratio of the speech period between the operator and the customer has a notable difference, a warning can be given.

Patent Document 2 describes a technique for detecting the state of a conversation for which the sound pressure level is equal to or less than a reference value continues for a predetermined period of time for quantitative evaluation of proper speech. Patent Document 3 describes a technique for estimating customer's psychological state from a silent period and the number of suspended states. However, the techniques described in Patent Documents 1 to 3 cannot observe the entire conversation between the agent at the call center and the customer to extract a conversation having a high probability of including a characteristic dialogue.

[Patent Document 1] Japanese Patent Application Laid-Open No. 2007-33754

[Patent Document 2] Japanese Patent Application Laid-Open No. 2006-267465

[Patent Document 3] Japanese Patent Application Laid-Open No. 2002-51153

[Non-Patent Document 1] Etienne Marcheret et al., "The IBM RT06s Evaluation System for Speech Activity Detection in CHIL Seminars," In Proc. MLMI, Springer Berlin/Heidelbelg, 2006

SUMMARY OF THE INVENTION

It is an object of the present invention to provide a system, a method, and a program capable of solving the above-mentioned problem.

In solving the problems and according to a first aspect of the present invention, there is provided a system for processing voice data in a conversation between two persons. The system includes: a first variation calculator for calculating the variation of a first speaker's speech ratio (the ratio of the length of the speech period included in a frame of time to the length of the full frame of time) from the voice data in the conversation between the two persons; a second variation calculator for calculating the variation of a second speaker's speech ratio from the voice data in the conversation between the two persons; a difference calculator for calculating a difference data string representing a variation of the difference between the first speaker's speech ratio and the second speaker's speech ratio; a smoother for generating a smoothed difference data string by smoothing the difference data string; and a presenter for presenting variations of the first speaker's and the second speaker's speech ratios represented using the smoothed difference data string.

Further, there is provided a method and a program product (computer readable article of manufacture) allowing a computer to perform the functions of the system.

Accordingly, the present invention provides a method of processing voice data in a conversation between two persons to determine characteristic conversation patterns. The method includes the steps of:

calculating a variation of a speech ratio of a first speaker from the voice data in the conversation between the two persons;

calculating a variation of a speech ratio of a second speaker from the voice data in the conversation between the two persons;

calculating a difference data string representing a variation of the difference between the speech ratio of the first speaker and the speech ratio of the second speaker;

generating a smoothed difference data string; and grouping the conversations according to the patterns of the smoothed difference data strings.

Also provided is a computer readable article of manufacture tangibly embodying computer readable instructions for executing a computer implemented method of processing voice data in a conversation between two persons to determine characteristic conversation patterns in accordance with the method of the present invention.

Note that the overview of the invention does not necessarily include all the possible embodiments for the present invention. Further, sub-combinations of the features described can also be used to implement the invention.

BRIEF DESCRIPTION OF THE DRAWINGS

FIGS. 3A and 3B show an example of a speech signal and a speech period of the speech signal.

FIG. 12 shows an example of a display screen displayed by a display section as classification results from a grouping section.

FIG. 15 shows an example of data calculated in each step shown in FIG. 14.

DETAILED DESCRIPTION OF THE PREFERRED EMBODIMENT

The present invention will now be described in connection with a preferred embodiment. Note that the following embodiment does not limit the inventions described in the claims. Not all combinations of features described in the embodiment may be essential for solving the problem.

Figure 1:
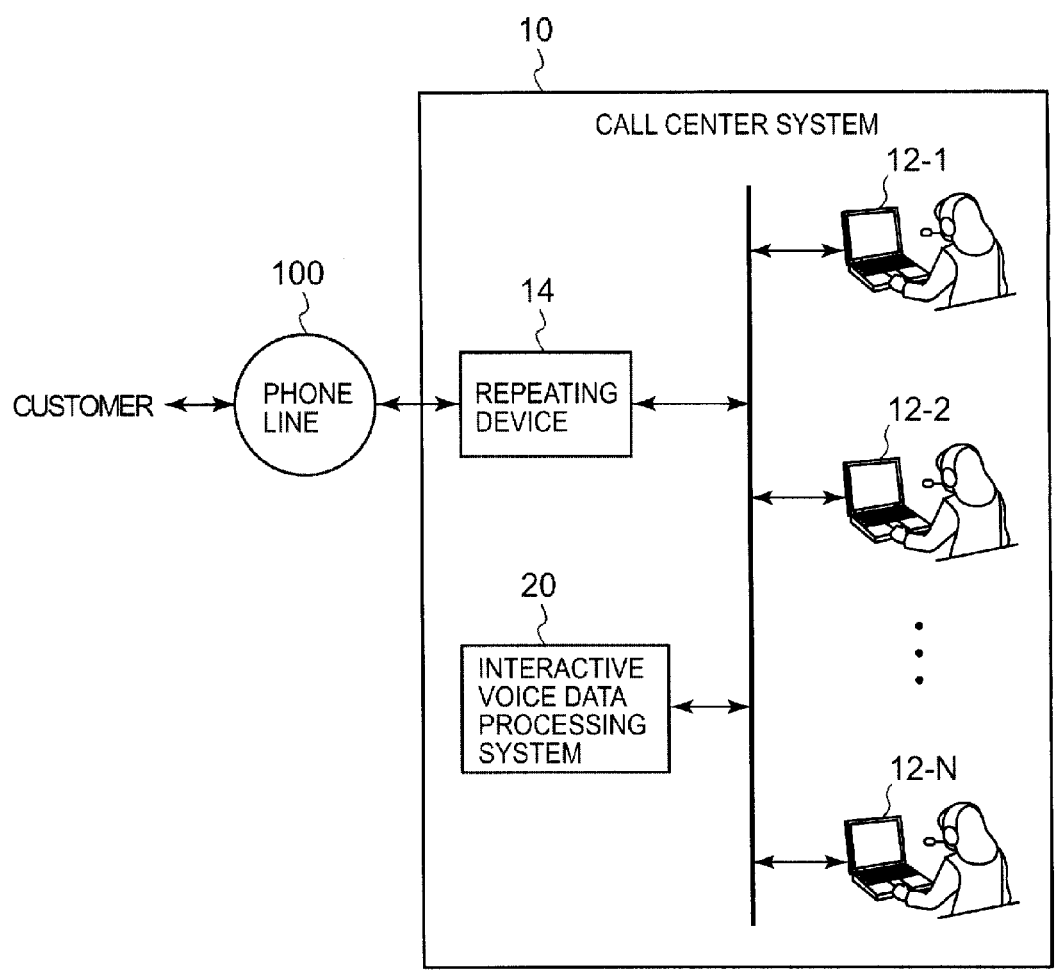
FIG. 1 shows a configuration of a call center system together with a phone line according to a preferred embodiment of the present invention.

FIG. 1 shows the configuration of a call center system 10 according to the embodiment together with a phone line 100.

The call center system 10 is used in a department (call center) for communicating with a customer by phone, for example, to sell a product to the customer over the phone, and to answer questions from the customer about the product. The call center system 10 connects a telephone set used by a phone operator (agent) assigned to the call center to a telephone set used by a customer through the phone line 100 to enable the agent to call the customer, i.e., communication between the agent and customer by phone.

The call center system 10 includes a plurality of terminals 12 (12-1 to 12-N), a repeating device 14, and an interactive voice data processing system 20. Each of the plurality of terminals 12 is used by each agent. Each of the plurality of terminals 12 has a telephone set and a data input/output computer.

The repeating device 14 connects a terminal 12 and the phone line 100. As an example, when an agent initiates a call, e.g., calls a customer (in the case of an outbound call), the repeating device 14 connects the terminal 12 of the agent to the phone line 100 to let the agent communicate with the customer. As another example, when a customer initiates a call, e.g., calls the call center (in the case of an inbound call), the incoming call from the customer is transferred to any one of the plurality of terminals 12 so that the customer can communicate with an agent.

The interactive voice data processing system 20 processes interactive voice data in a conversation between two persons (between a first speaker and a second speaker). In the embodiment, the interactive voice data processing system 20 processes voice data in a conversation between two persons to determine a speaker's speech ratio, the ratio of the length of the speech period included in a frame of time to the length of the full frame of time. To be more specific, in the embodiment, the interactive voice data processing system 20 classifies the speaker's speech ratio in a call made in the call center system 10 in addition to recording the speaker's voice in the call. In other words, the interactive voice data processing system 20 also classifies the conversation over the phone between an agent (first speaker) and a customer (second speaker) based on the speaker's speech ratio.

As an example, the interactive voice data processing system 20 can classify, by each characteristic, multi-person calls made in the call center system 10. Further, the interactive voice data processing system 20 can detect whether a call made in the call center system 10 has a predetermined characteristic or not. For example, the interactive voice data processing system 20 can detect whether the call made in the call center system 10 is a conversation having a high probability of including a characteristic dialogue or not, e.g., whether the call is a conversation having a high probability of succeeding in selling a product or not.

Note that the interactive voice data processing system 20 is not limited to functioning in the call center system 10. It can classify a conversation between any two persons. As still another example, the interactive voice data processing system 20 can classify a direct conversation between two persons without going through any communication equipment, or a conversation through communication equipment other than the telephone.

Figure 2:
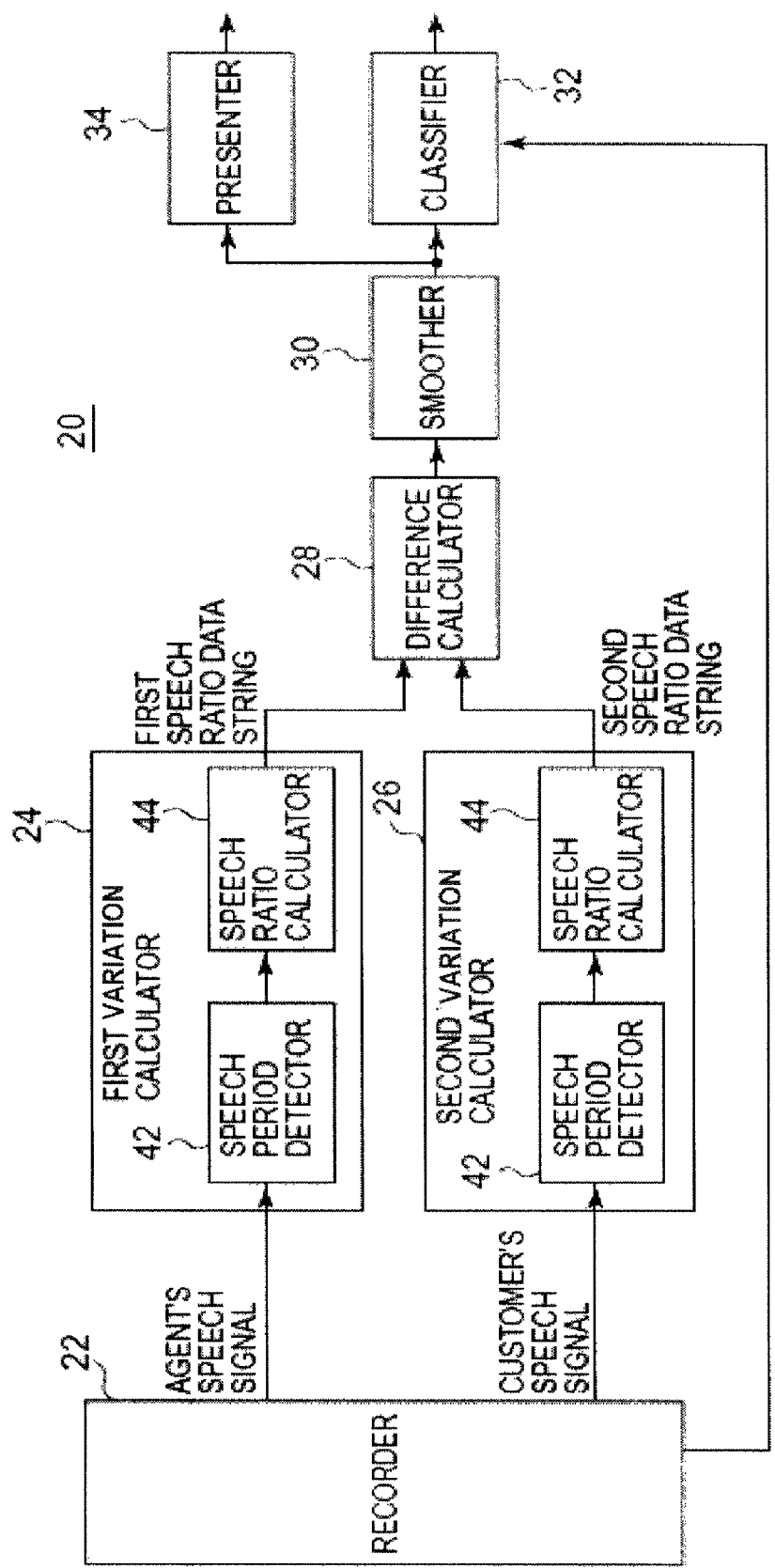
FIG. 2 shows a configuration of an interactive voice data processing system 20 according to the embodiment.

FIG. 2 shows a configuration of the interactive voice data processing system 20 according to the embodiment. The interactive voice data processing system 20 includes a recorder 22, a first variation calculator 24, a second variation calculator 26, a difference calculator 28, a smoother 30, and a presenter 34.

The recorder 22 records, for each conversation, a speech signal representing the voice between two persons (conversation) over the phone between the agent (first speaker) and the customer (second speaker)) made in the call center system 10. As an example, the recorder 22 can record speech signals (voice data) for multi-person conversations, respectively, in association with IDs (identifications) for identifying the conversations, respectively. Here, the recorder 22 records a speech signal representing the voice of the agent and a speech signal representing the voice of the customer separately. Further, as another example, the recorder 22 can record information for identifying the agent and the date and time of the conversation, and the like, together with the speech signal.

The first variation calculator 24 calculates the variation of a speech ratio of the agent from voice data in a conversation between the agent and the customer. As an example, the first variation calculator 24 can read, from the recorder 22, the speech signal of the agent in a conversation to be classified. Then, the first variation calculator 24 can calculate a first speech ratio data string representing the speech ratio of the agent in the conversation to be classified based on the speech signal.

The first variation calculator 2 can include a speech period detector 42 and a speech ratio calculator 44. The details of the speech period detector 42 and the speech ratio calculator 44 will be described later in reference to FIGS. 3A and 3B to FIG. 7.

The second variation calculator 26 calculates the variation of the speech ratio of the customer from voice data in a conversation between the agent and the customer. As an example, the second variation calculator 26 can read, from the recorder 22, the speech signal of the customer in the conversation to be classified. Then, the second variation calculator 26 can calculate, based on the speech signal, a second speech ratio data string representing the variation of the speech ratio of the customer in the conversation to be classified.

The second variation calculator 26 can include a speech period detector 42 and a speech ratio calculator 44. The speech period detector 42 and the speech ratio calculator 44 have the same configuration as the speech period detector 42 and the speech ratio calculator 44 included in the first variation calculator 24. The details of this will be described later in reference to FIGS. 3A and 3B to FIG. 7.

The difference calculator 28 calculates a difference data string representing the variation of the difference between the speech ratio of the agent and the speech ratio of the customer. As an example, the difference calculator 28 can calculate a difference data string representing the difference between a first speech ratio data string calculated by the first variation calculator 24 and a second speech ratio data string calculated by the second variation calculator 26.

The smoother 30 generates a smoothed difference data string by smoothing the difference data string. As an example, the smoother 30 can generate the smoothed difference data string using Bezier curves or a neighboring n-point average filter, the details of which are described with reference to FIG. 9 and FIG. 10.

The presenter 34 presents a variation of the speech ratio between the agent and the customer represented using the smoothed difference data string. The presenter 34 includes a classifier 32. The classifier 32 classifies a conversation between the agent and the customer based on the smoothed difference data string generated by the smoother 30. As an example, the classifier 32 can classify the conversation by grouping a plurality of smoothed difference data strings having data patterns similar to one another. As another example, the classifier 32 can classify the conversation by detecting whether a smoothed difference data string is similar to or matches a predetermined pattern.

For example, the classifier 32 can group and classify a plurality of conversations having similar smoothed difference data strings, displaying the plurality of classified conversations for each group. Further, for example, the classifier 32 can classify a plurality of conversations for each agent, displaying the plurality of classified conversations for each agent.

Further, for example, the classifier 32 can display the plurality of classified conversations for each group. Then, if a group is selected from the plurality of conversations displayed for each group, the classifier 32 can display the conversations included in the selected group in chronological order.

Further, for example, the classifier 32 can extract a smoothed difference data string that matches a target pattern to be extracted to replay, from the recorder 22, a speech signal corresponding to the extracted, smoothed difference data string. In this case, the classifier 32 can change the target pattern according to whether the agent initiates the call (outbound call) or the customer initiates the call (inbound call).

Note that a further detailed configuration of the classifier 32 will be described later with reference to FIG. 11.

FIGS. 3A and 3B show an example of a speech signal and a speech period of the speech signal. To be more specific, FIG. 3A shows a speech signal of the agent in a conversation and its speech period. FIG. 3B shows an example of a speech signal of the customer and its speech period.

The speech period detector 42 reads, from the recorder 22, a speech signal of the agent (or the customer) to be classified. Then, the speech period detector 42 analyzes the speech signal to detect a speech period (interval) during which the agent (or the customer) speaks or outputs words by voice. As an example, the speech period detector 42 can output the start time and the end time as the speech period during which the agent (or the customer) speaks.

As another example, the speech period detector 42 can detect the speech period from the speech signal using a VAD (Voice Activity Detection) technique. An example of VAD is described in Non-Patent Document 1.

Figure 4:
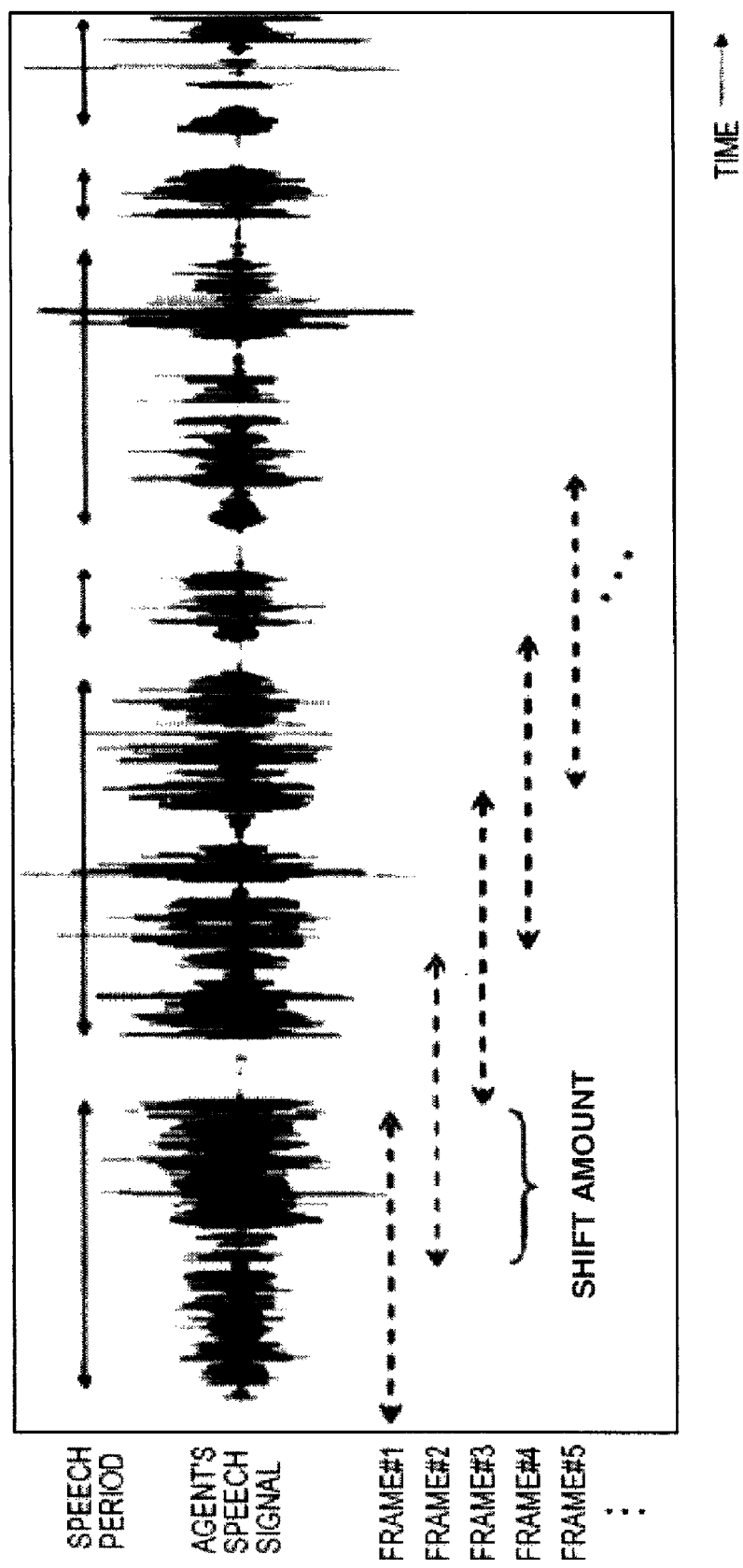
FIG. 4 shows an example of the speech signal and the speech period of an agent shown in FIG. 3A, and an example of a frame set by a speech ratio calculator to calculate a speech ratio.
Figure 5:
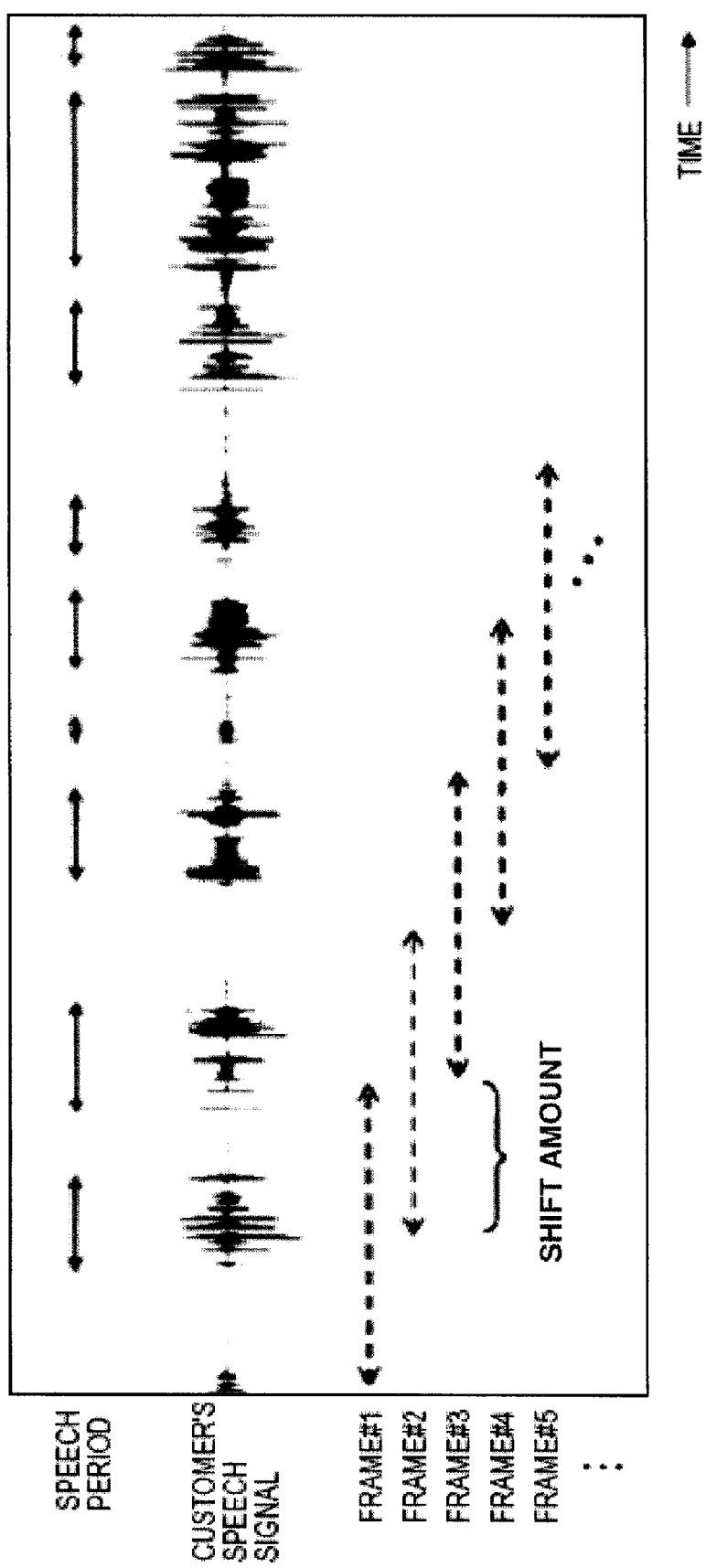
FIG. 5 shows an example of the speech signal and the speech period of a customer shown in FIG. 3B, and an example of a frame set by the speech ratio calculator to calculate a speech ratio.

FIG. 4 shows an example of the speech signal and the speech period of the agent shown in FIG. 3A, and an example of a frame set by the speech ratio calculator 44 to calculate the speech ratio. FIG. 5 shows an example of the speech signal and the speech period of the customer shown in FIG. 3B, and an example of a frame set by the speech ratio calculator 44 to calculate the speech ratio.

The speech ratio calculator 44 sets the frame designating a period that is part of the speech signal by shifting a predetermined period of time in sequence from the start point to the end point. As an example, the speech ratio calculator 44 can set a frame for which the period is w sec. (e.g., 30 sec.) and which shifts at s sec. intervals (e.g., 15 sec.) in sequence.

Then, the speech ratio calculator 44 calculates, as a speech ratio, the ratio of the speech period included in each period designated by the frame. In other words, for each of a plurality of frames set in sequence, the speech ratio calculator 44 calculates, as the speech ratio, the ratio of a length of the speech period included in the frame to the length of the total time of the frame. As an example, the speech ratio calculator 44 can output, as the speech ratio, "0" when no speech period is included in the frame and "1" when the speech period is included across the full period of time.

Note that the speech ratio calculator 44 can set a frame for designating a period of time shorter than the length of time across the whole conversation. Further, as another example, the speech ratio calculator 44 can set the amount of frame shift shorter than the length of time of the frame. Thus, the speech ratio calculator 44 can calculate the speech ratio across the whole conversation without any open intervals.

Further, as an example, the speech ratio calculator 44 can set a frame having the same length of time, the same amount of shift, and the same timing for the speech signal of the agent and the speech signal of the customer. In this case, the speech ratio calculator 44 can calculate the speech ratio of the speech signal according to increments of time synchronized with each other.

Figure 6:
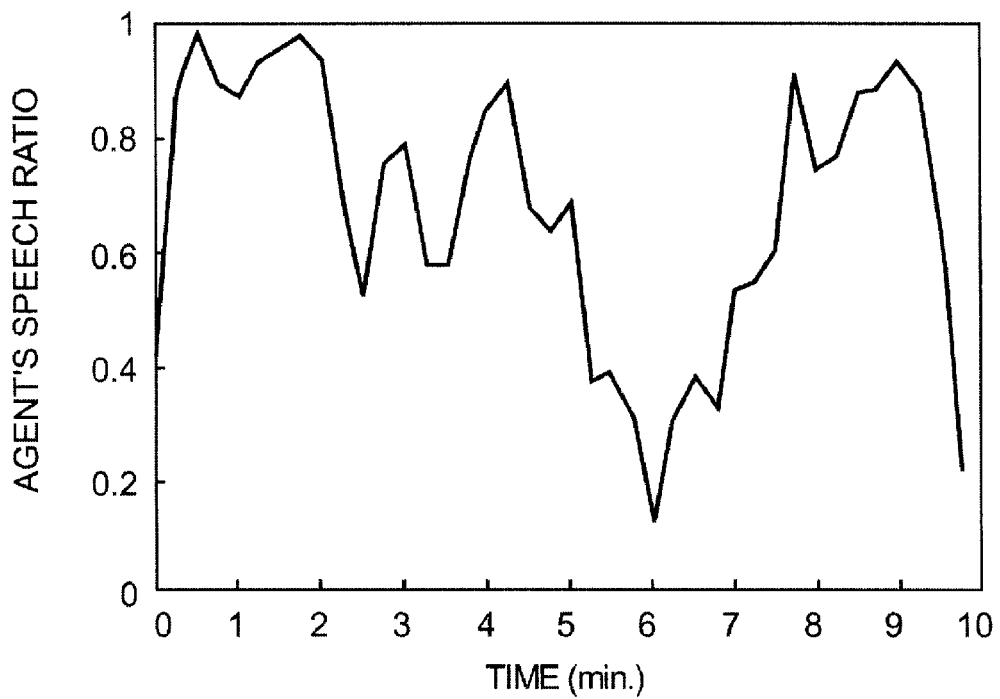
FIG. 6 shows an example of a variation of the speech ratio of the agent calculated from the speech signal shown in FIG. 4.
Figure 7:
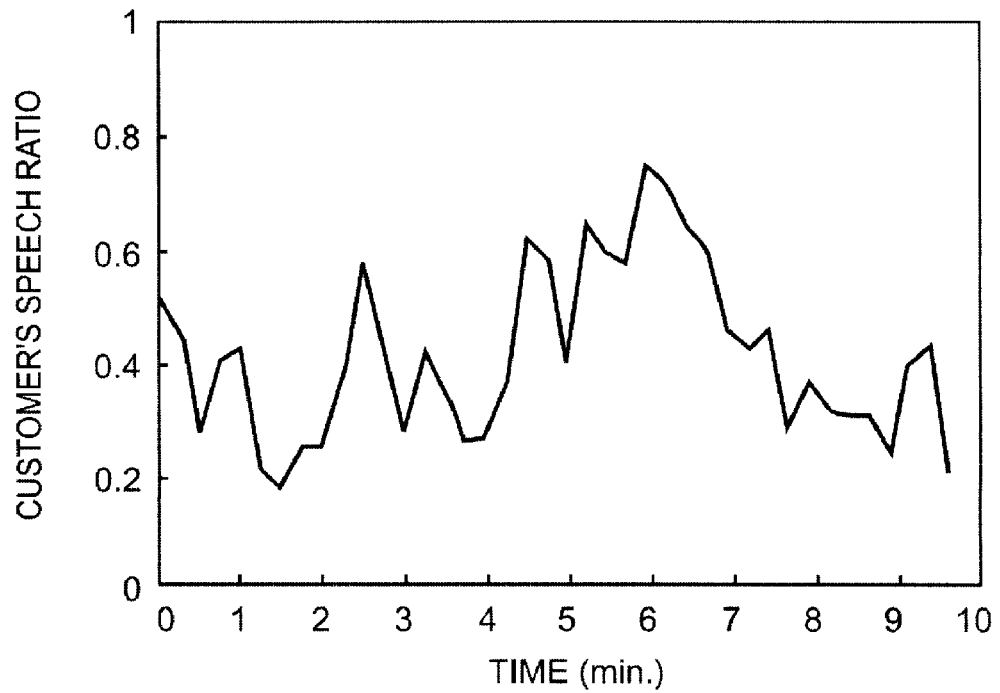
FIG. 7 shows an example of a variation of the speech ratio of the customer calculated from the speech signal shown in FIG. 5.

FIG. 6 shows an example of a variation of the speech ratio of the agent calculated from the speech signal shown in FIG. 4. FIG. 7 shows an example of a variation of the speech ratio of the customer calculated from the speech signal shown in FIG. 5. Particularly, in the embodiment, since processing for detecting the speech period from voice data to calculate the speech ratio is performed, the variation of the speech ratio in the conversation between two persons can be presented as a result of a short calculation, e.g., in a calculation time of, for example, equal to or less than one thousandth than that of a case where the speech is converted to text. In other words, voice data in more conversations can be processed.

The speech ratio calculator 44 outputs, in sequence, data representing the speech ratio calculated while shifting frames in sequence. As an example, the speech ratio calculator 44 can output a data string of the speech ratio represented by a value in a range of 0 to 1 as shown in FIG. 6 and FIG. 7. Thus, the speech ratio calculator 44 can generate the first speech ratio data string representing the variation of the speech ratio of the agent in the conversation between the agent and the customer, and the second speech ratio data string representing the variation of the speech ratio of the customer in the conversation between the agent and the customer.

Figure 8:
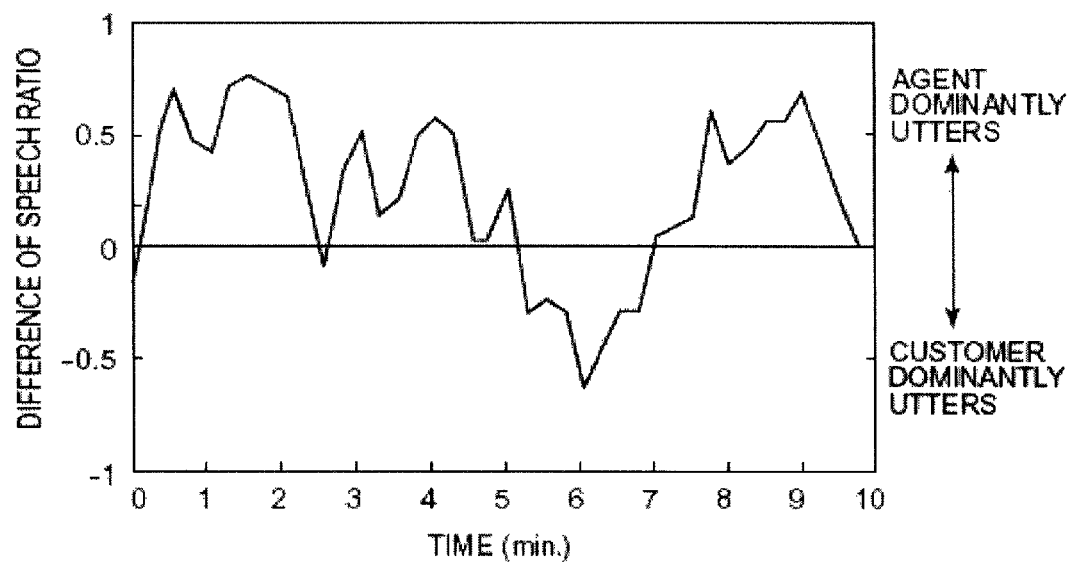
FIG. 8 shows an example of the variation of a difference between the speech ratio of the agent shown in FIG. 6 and the speech ratio of the customer shown in FIG. 7.

FIG. 8 shows an example of the variation of a difference between the speech ratio of the agent shown in FIG. 6 and the speech ratio of the customer shown in FIG. 7. The difference calculator 28 calculates, in sequence, a difference value by subtracting a value corresponding to the second speech ratio data string (e.g., a value generated based on the speech signal sampled at the same time) from each value of the first speech ratio data string calculated by the first variation calculator 24. Then, the difference calculator 28 outputs the calculated difference values in sequence.

As an example, the difference calculator 28 can output a difference data string as a time-series data sequence of difference values (e.g., values represented in a range of −1 and 1) by subtracting the speech ratio of the customer from the speech ratio of the agent as shown in FIG. 8. In this case, each value of the difference data string takes on a value close to 1 when the agent predominantly speaks, a value close to −1 when the customer predominantly speaks, and a value close to 0 when the agent and the customer speak equally. Thus, the difference calculator 28 can calculate the difference data string representing the variation of a difference between the speech ratio of the agent and the speech ratio of the customer.

Figure 9:
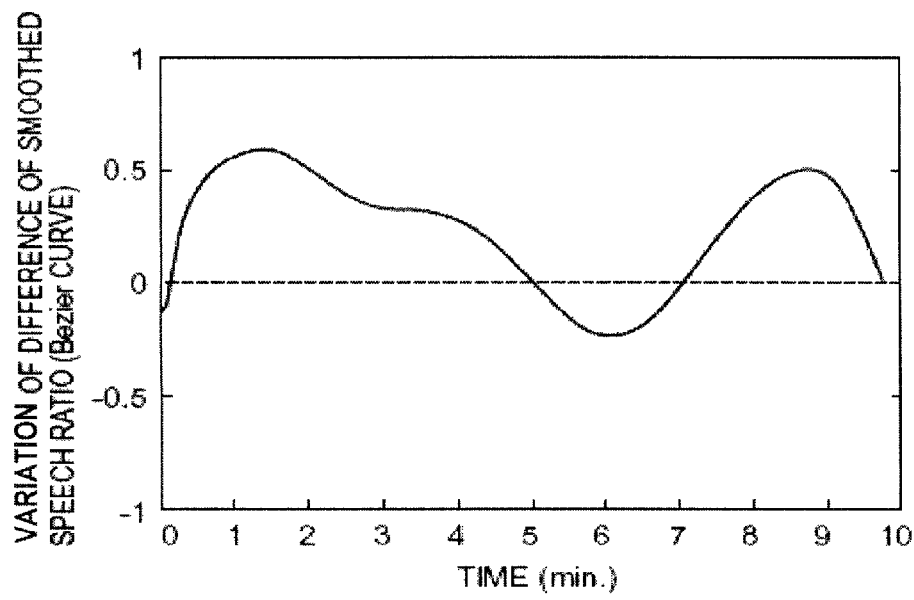
FIG. 9 shows a curve smoothed using Bezier curves representing the variation of a difference between the speech ratio of the agent and the speech ratio of the customer shown in FIG. 8.
Figure 10:
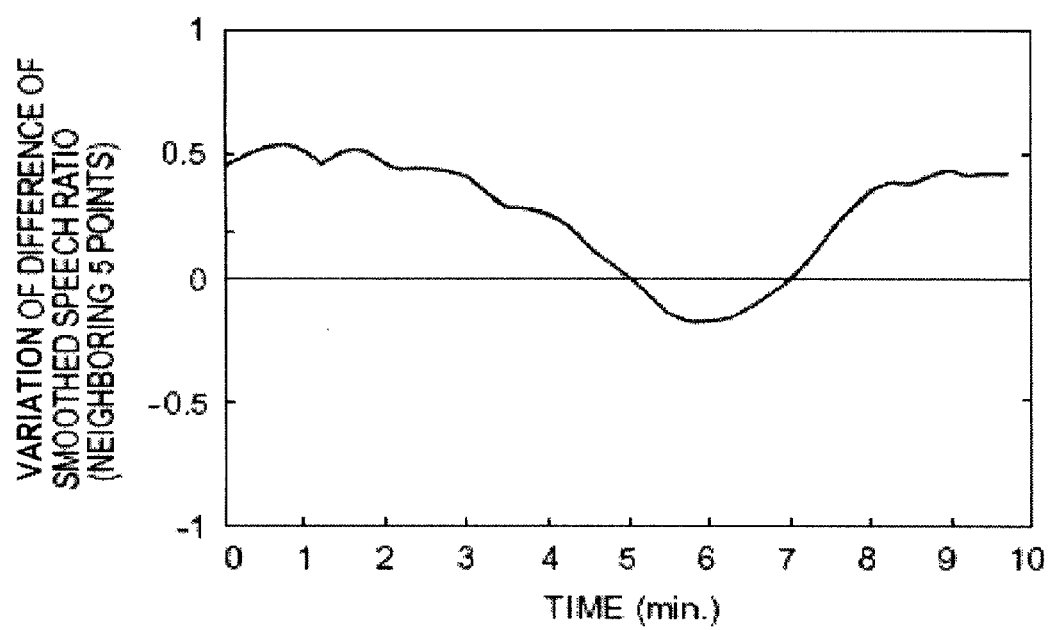
FIG. 10 shows a curve smoothed using filter processing for averaging five neighboring points representing the variation of a difference between the speech ratio of the agent and the speech ratio of the customer shown in FIG. 8

FIG. 9 shows a curve smoothed using Bezier curves representing the variation of a difference between the speech ratio of the agent and the speech ratio of the customer shown in FIG. 8. FIG. 10 shows a curve smoothed using filter processing for averaging the neighboring five points representing the variation of the difference between the speech ratio of the agent and the speech ratio of the customer shown in FIG. 8.

As an example, the smoother 30 can smooth, in smoothing processing using Bezier curves, the difference data string generated by the difference calculator 28. In other words, the smoother 30 can generate a data string representing a curve shown in FIG. 9 using Bezier curves from the data string representing the line chart shown in FIG. 8.

Further, as another example, the smoother 30 can smooth the difference data string generated by the difference calculator 28 by means of filter processing for averaging the neighboring n points (were n is natural number). In other words, the smoother 30 can generate a data string representing a curve as shown in FIG. 10 from the data string representing the line chart shown in FIG. 8 using filter processing for averaging the neighboring n points (five in this example).

Thus, the smoother 30 can generate a smoothed difference data string by smoothing the difference data string. Therefore, for example, the smoother 30 can remove from the difference data string, for example, a speech component during which the agent or customer is just nodding. Note that the smoother 30 can employ any other smoothing filter instead of Bezier curves as the filter for averaging the neighboring n points.

Figure 11:
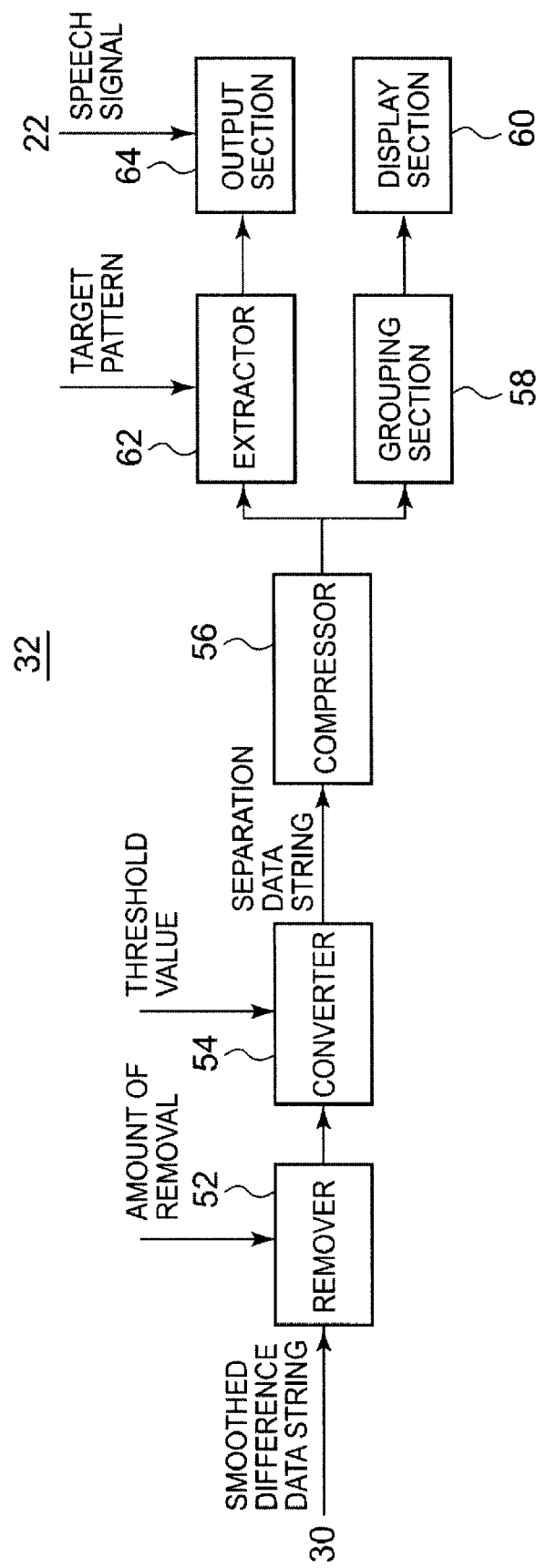
FIG. 11 shows an example of a configuration of a classifier according to the embodiment.

FIG. 11 shows an example of the configuration of the classifier 32 according to the embodiment. As an example, the classifier 32 can include a remover 52, a converter 54, a compressor 56, a grouping section 58, a display section 60, an extractor 62, and an output section 64.

The remover 52 is given the smoothed difference data string from the smoother 30 for each conversation to be classified. In this example, each value of the smoothed difference data string is represented by a value in a range of −1 to 1.

The remover 52 removes at least either of a top portion and/or an end portion from the given smoothed difference data string, of a conversation between two persons. As an example, the remover 52 can remove data for a certain number of frames of the top (beginning) portion in the smoothed difference data string. Further, as another example, the remover 52 can remove data for a certain number of frames of the end portion in the smoothed difference data string. Thus, the remover 52 can remove extra sounds or voices in a conversation (e.g., a phone's ringing sound, a formal greeting, etc.). Note that the classifier 32 does not need to include the remover 52.

The converter 54 is given the smoothed difference data string from which at least either of the top portion or the end portion may be removed by the remover 52. The converter 54 converts the given, smoothed difference data string to a classification data string representing the variation of values identifying states in which the agent predominantly speaks, the customer predominantly speaks, and the agent and the customer both speak.

If each value included in the smoothed difference data string is larger than a first threshold value (e.g., 0.4), the converter 54 can convert it to a value (e.g., 1) representing when the agent predominantly speaks. Further, if each value included in the smoothed difference data string is smaller than a second threshold value (e.g., −0.3) smaller than the first threshold value, the converter 54 can convert it to a value (e.g., −1) representing when the customer predominantly speaks. Further, if each value included in the smoothed difference data string is no larger than the first threshold value and no smaller than the second threshold value (e.g., no larger than 0.4 and no smaller than −0.3), the converter 54 can convert it to a value (e.g., 0) representing when the agent and the customer both speak. Thus, the converter 54 can output a classification data string representing the variation of values identifying the state in which the agent predominantly speaks (e.g., 1), the state in which the customer predominantly speaks (e.g., −1), and the state in which the agent and the customer both speak (e.g., 0).

Further, in this case, the converter 54 can change the first threshold value and the second threshold value according to: the content of a call made by the agent to the customer, the content of inquiry from the customer to the call center, etc. As another example, the converter 54 can change the first threshold value and the second threshold value according to whether the call is an inbound call or an outbound call.

The compressor 56 is given a classification data string generated by the converter 54. The compressor 56 replaces a pattern in which a sequence of equal values occur in the classification data string with a pattern in which the number of equal values is one. As an example, if the classification data string includes a "1, 1, −1, −1" pattern, the compressor 56 can replace it with a "1, −1" pattern. Thus, the compressor 56 can convert the classification data string to a data string in a format for comparing it with another data string while holding the characteristic of the conversation.

Further, as another example, the compressor 56 can set an upper limit on the sequential number of equal values. When three is set as the upper limit, if the classification data string includes a "1, 1, 1, 1, 1, 1, −1, −1, −1, −1" pattern, the compressor 56 can replace the pattern with a "1, 1, −1, −1" pattern. Note that the classifier 32 does not need to include the compressor 56.

The grouping section 58 is given a compressed classification data string from the compressor 56. The grouping section 58 groups the compressed classification data string within the plurality of conversations. As an example, the grouping section 58 groups the compressed classification data string within the plurality of conversations for each of matching or similar patterns. Further, as another example, the grouping section 58 can group the compressed classification data string within the plurality of conversations after classification for each agent.

The display section 60 displays a plurality of grouped, compressed classification data strings. As an example, the display section 60 can also display a corresponding conversation ID together with the compressed classification data string. Further, as another example, the display section 60 can display a plurality of grouped, compressed classification data strings for each of a plurality of agents.

Thus, the grouping section 58 and the display section 60 can present, to a user, the grouped, compressed classification data string grouped by each characteristic of the conversations. For example, the grouping section 58 and the display section 60 can present to the user, the conversations grouped for each characteristic, such as: a conversation in which the agent unilaterally speaks, a conversation in which the customer unilaterally speaks, a conversation in which both speak equally, a conversation in which the agent unilaterally speaks in the first half and the customer unilaterally speaks in the latter half, etc.

The extractor 62 is given the compressed classification data string from the compressor 56. The extractor 62 extracts information as to whether a given, compressed classification data string matches a pattern to be extracted. The extractor 62 can extract, from the grouping section 58, a compressed classification data string included in a group corresponding to the pattern to be extracted.

Further, the tendency of the speech ratio in a conversation varies depending on whether the conversation is an outbound call or an inbound call. Therefore, as an example, the extractor 62 can change the target pattern depending on whether the conversation is an outbound call or an inbound call. The output section 64 reads, from the recorder 22, a speech signal in a conversation corresponding to the compressed classification data string extracted by the extractor 62, and output it to the user.

Thus, the extractor 62 and the output section 64 can extract a conversation having a predetermined characteristic and output it to the user. The extractor 62 and output section 64 can output voices in a conversation, for example, in which the agent unilaterally speaks.

Instead of the above-mentioned configuration, the classifier 32 can have a configuration for calculating the variation of values representing which of the agent or the customer predominantly speaks in a conversation according to the rate of change (inclination) in data in the smoothed difference data string. Thus, the classifier 32 can classify the conversations according to how the initiative of the conversation changes. Thus, as an example, the classifier 32 can classify the conversations such as: a conversation in which the agent takes the initiative at first and gradually the initiative shifts to the customer; a conversation in which the customer starts speaking suddenly, etc.

FIG. 12 shows an example of a display screen displayed by the display section 60 as classification results from the grouping section 58. As shown in FIG. 12, as an example, the display section 60 can display respective value patterns of compressed classification data strings and the number of conversations that take each pattern. Thus, the display section 60 can present, to the user, a pattern having a relatively large number and a unique pattern having a relatively small number.

Further, in response to selection of a pattern on the screen shown in FIG. 12, the display section 60 can display conversation IDs corresponding to the selected pattern in chronological order. Further, as another example, the display section 60 can display the screen shown in FIG. 12 for each agent. Further, for example, when the user selects an ID or pattern displayed on the display section 60, the output section 64 can read the speech signal in the conversation from the recorder 22 and output it to the user.

Figure 13:
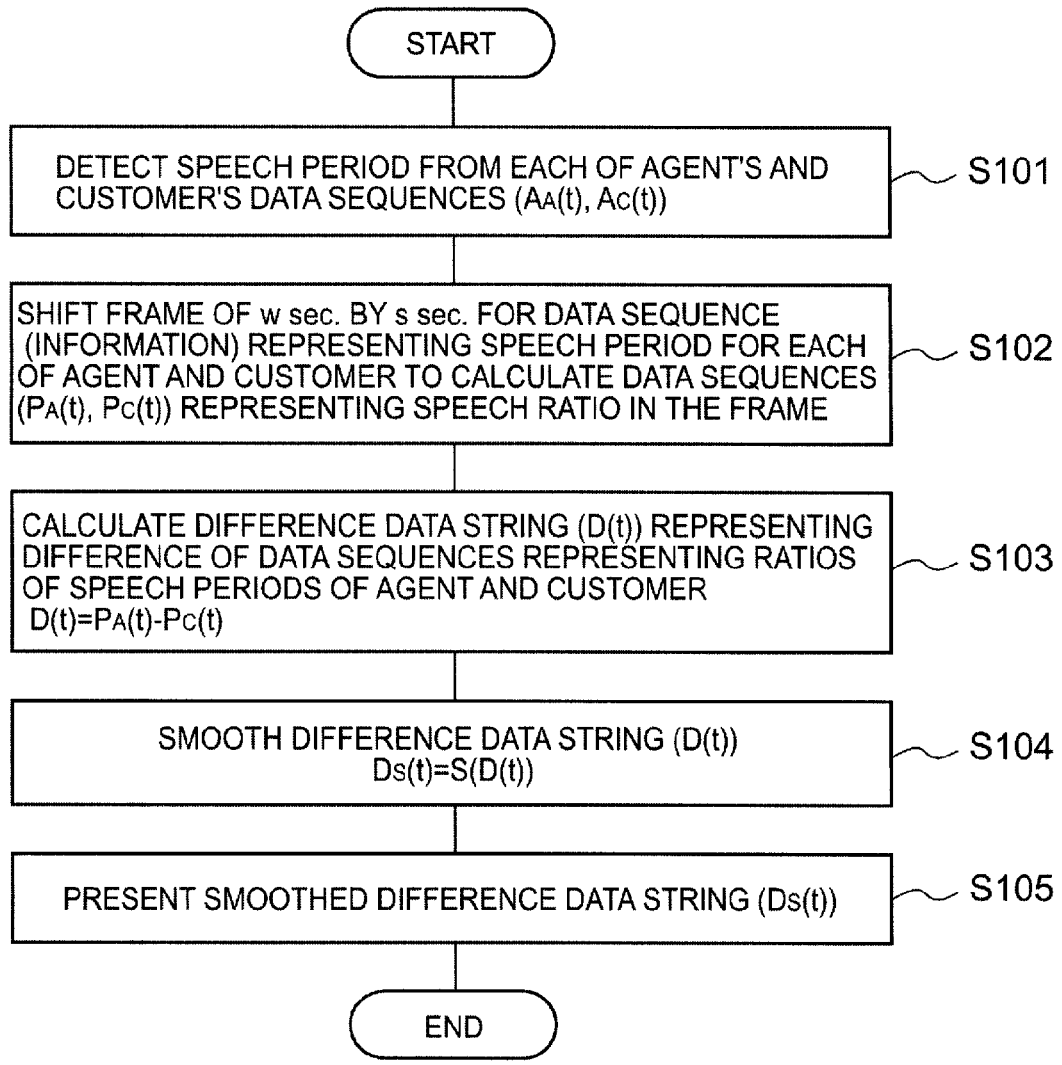
FIG. 13 shows an example of a processing flow of an interactive voice data processing system.

FIG. 13 shows an example of a processing flow of the interactive voice data processing system 20. The interactive voice data processing system 20 performs processing steps S101 to S105 shown in FIG. 13 for each of the conversations recorded on the recorder 22.

First, in step S101, the speech period detector 42 calculates a data sequence representing the speech period of the agent from a voice data sequence, $A_A(t)$, of the agent. Further, in step S101, the speech period detector 42 calculates a data sequence representing the speech period of the customer from a voice data sequence, $A_C(t)$.

As an example, the speech period detector 42 can output a binary data sequence as the data sequence representing the speech period, where time determined to be an utterance or speech is set to "1" and time determined to be a non-utterance is set to "0." Instead, the speech period detector 42 can output information representing the start time and the end time of the speech period for each of one or more speech periods included in a range from the top to the end of a conversation.

As a method of detecting the speech period (or non-speech period) from the voice data sequence, for example, there is VAD technique described in Non-Patent Document 1. Further, as another method, the speech period can be determined, for example, based on the variation of voice power (level of the variation).

Then, in step S102, the speech ratio calculator 44 shifts a frame of w sec. (e.g., 30 sec.) by s sec. (e.g., 15 sec.) for the data sequence representing the speech periods of the agent and the customer, respectively, to calculate data sequences ($P_A(t)$, $P_C(t)$) representing the ratio of the speech periods in the frame. For example, the speech ratio calculator 44 can calculate the data sequences ($P_A(t)$, $P_C(t)$) representing the ratio of the speech periods by performing the following processing (or operation).

For example, in step S101, it is assumed that the following speech periods are calculated:
 speech period 1 (start time-end time): 3 sec.-5 sec.,
 speech period 2: 10 sec.-20 sec., and
 speech period 3: 28 sec.-30 sec.

In this case, in a frame starting at time 0 sec., the total speech period is (5−3)+(20−10)+(30−28)=14 sec. Thus, the speech ratio calculator 44 calculates 14 sec./30 sec.=0.47 for this frame as the ratio of speech periods.

Then, in step S103, the difference calculator 28 calculates a difference data string (D(t)) representing a difference between a data sequence ($P_A(t)$) representing the speech ratio of the agent and a data sequence ($P_C(t)$) representing the speech ratio of the customer. As an example, the difference calculator 28 calculates the difference data string D(t) by making the following calculation for each sample: $D(t)=P_A(t)-P_C(t)$.

Then, in step S104, the smoother 30 calculates a smoothed difference data string ($D_S(t)$) by smoothing the difference data string D(t). As an example, the smoother 30 can calculate the smoothed difference data string ($D_S(t)$) by filtering the difference data string (D(t)) through an equalization filter.

To be more specific, for example, the smoother 30 can calculate the smoothed difference data string ($D_S(t)$) by calculating the following equation (1). Note that, in the equation (1), the difference data string D(t) is represented as $D_i$ (i=0, 1, 2, . . . , N) and the smoothed difference data string $D_S(t)$ is represented as $D_{si}$ (i=0, 1, 2, . . . , N).

$$Ds_i = \frac{1}{2k+1} \sum_{j=i-k}^{i+k} D_j \quad \text{[Equation 1]}$$

Note that the smoother 30 can perform a separately revised operation for the top portion (i<k) and the end portion (i>N−k) of the data sequence. As another example, the smoother 30 can make a calculation by interpolating a data value prior to the top data or after the end data of the difference data string Di.

Then, in step S105, the presenter 34 presents, to the user, the smoothed difference data string (D(t)) calculated in step S104. As an example, the presenter 34 can classify the smoothed difference data string for each group to display, to the user, the classified, smoothed difference data string.

Figure 14:
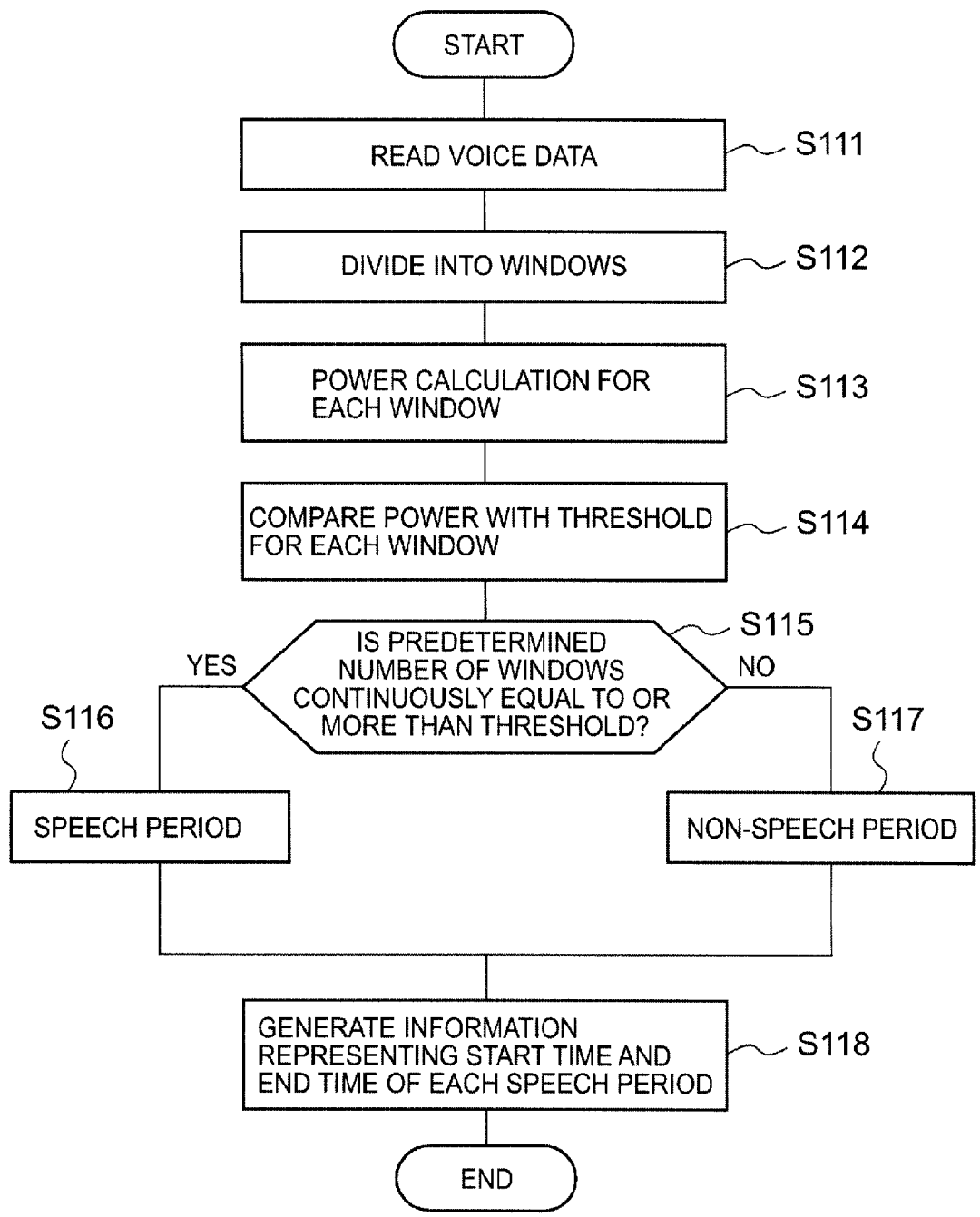
FIG. 14 shows an example of a detection flow of the speech periods executed in step S101 of FIG. 13.

FIG. 14 shows an example of a detection flow of the speech periods executed in step S101 of FIG. 13. FIG. 15 shows an example of data calculated in each step shown in FIG. 14.

First, in step S111, the speech period detector 42 reads a voice data sequence. As an example, the speech period detector 42 can read voice data as shown in FIG. 15(A).

Then, in step S112, the speech period detector 42 divides the voice data sequence into micro times (windows). As an example, the speech period detector 42 can divide the voice data sequence as shown in FIG. 15(B). It is preferable that the window be a sufficiently shorter period (e.g., a few tens of msec.) than the frame in step S102.

Then, in step S113, the speech period detector 42 calculates the power of voice data in each window. As an example, the speech period detector 42 can calculate the power (level of the variation) for each window as shown in FIG. 15(C).

Then, in step S114, the speech period detector 42 compares the power for each window with a predetermined threshold value. Then, in step S115, the speech period detector 42 determines whether the power in a predetermined number of windows is continuously equal to or more than the threshold value. Then, the speech period detector 42 determines, as a speech period, a period in which power in the predetermined number of windows is continuously equal to or more than the threshold value (S116), and a period other than the speech period as a non-speech period (S117).

Then, in step S118, the speech period detector 42 generates information representing the start time and the end time in each period determined to be a speech period of the voice data. As an example, the speech period detector 42 can generate information as shown in FIG. 15(D).

Figure 16:
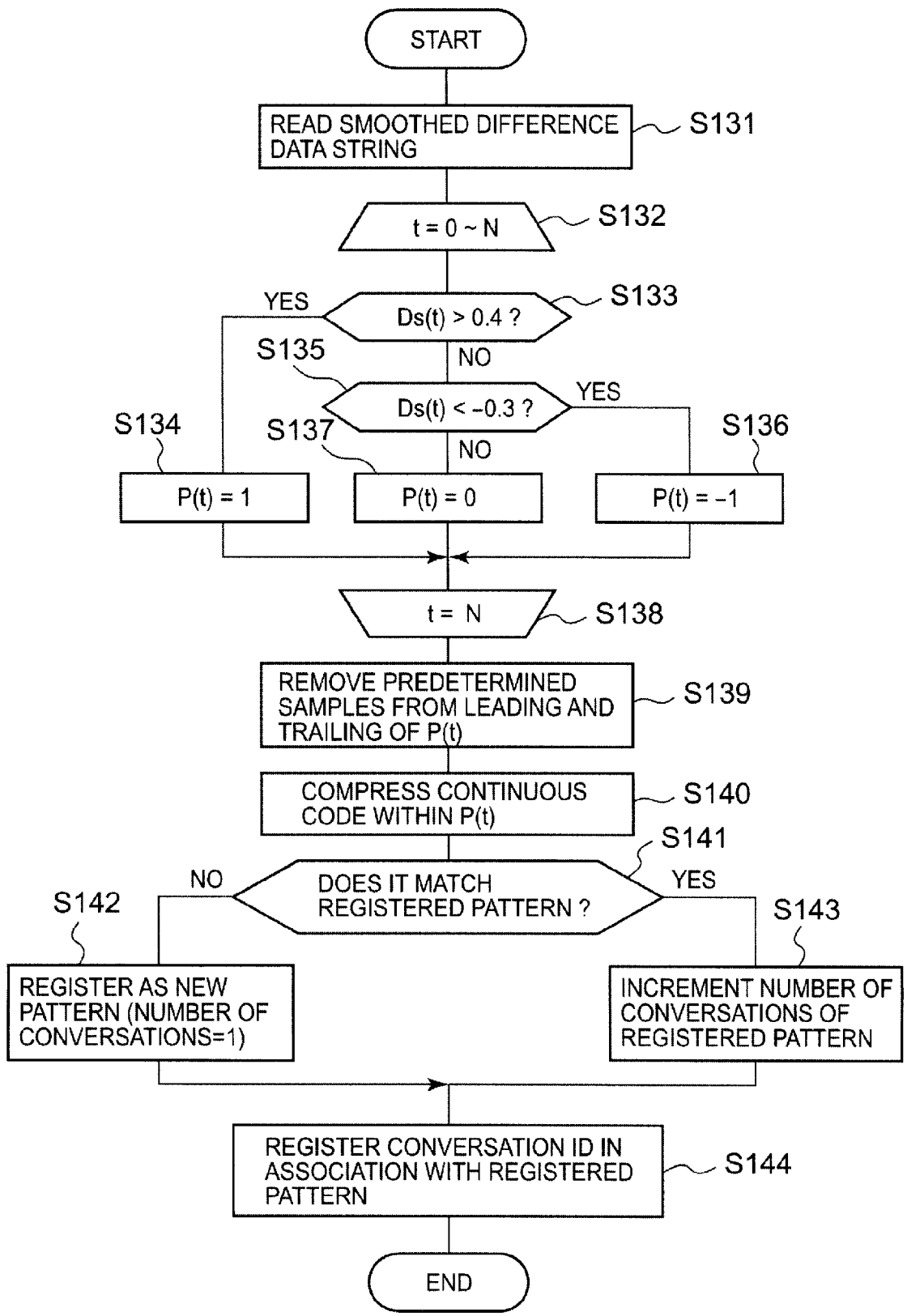
FIG. 16 shows an example of a classification processing flow performed by the classifier within a presenter in step S105 of FIG. 13.

FIG. 16 shows an example of a classification processing flow performed by the classifier 32 within the presenter 34 in step S105 of FIG. 13. First, in step S131, the classifier 32 reads the smoothed difference data string ($D_S(t)$).

Then, the classifier 32 repeatedly performs processing from step S133 to step S137 for each sample in sequence from the first sample ($D_S(0)$) to the last sample ($D_S(N)$) of the smoothed difference data string ($D_S(t)$) to generate the classification data string (P(t)) (S132, S138). First, in step S133, the classifier 32 determines whether the selected sample value is larger than a first threshold value (e.g., 0.4). If the selected sample value is larger than the first threshold value (e.g., 0.4) (Yes in step S133), a sample value corresponding to the classification data string (P(t)) is set to "1" in step S134.

If the selected sample value is equal to or less than the first threshold value (e.g., 0.4) (No in step S133), then the classifier 32 determines whether the selected sample value is smaller than a second threshold value (e.g., −0.3) in step S135. If the selected sample value is smaller than the second threshold value (e.g., −0.3) (Yes in step S135), the classifier 32 sets the sample value corresponding to the classification data string (P(t)) to "−1" in step S136. If the selected sample value is equal to or more than the second threshold value (e.g., −0.3) (No in step S135), the classifier 32 sets the sample value corresponding to the classification data string (P(t)) to "0" in step S137.

Then, in step S139, the classifier 32 removes a predetermined number of samples from the top to end of the classification data string (P(t)). Then, in step S140, the classifier 32 replaces a pattern in which a sequence of equal values occur with a pattern of one value to generate a compressed classification data string (P(t)).

Then, in step S141, the classifier 32 determines whether the compressed classification data string (P(t)) matches a registered pattern. If the compressed classification data string (P(t)) does not match the registered pattern (No in S141), the classifier 32 registers in step S142 the data pattern of the compressed classification data string (P(t)) as a new pattern. Further, in step S142, the classifier 32 sets the number of conversations of the registered pattern to "1." On the other hand, if the compressed classification data string (P(t)) matches a registered pattern (Yes in S141), the classifier 32 increments the number of conversations of the registered pattern in step S143.

Then, in step S144, the classifier 32 registers a conversation ID in association with the pattern newly registered in step S142 or the registered pattern in which the number of conversations is incremented in step S143. Thus, the interactive voice data processing system 20 performs the above processing, enabling the classification of a conversation between the agent and the customer at the call center.

Figure 17:
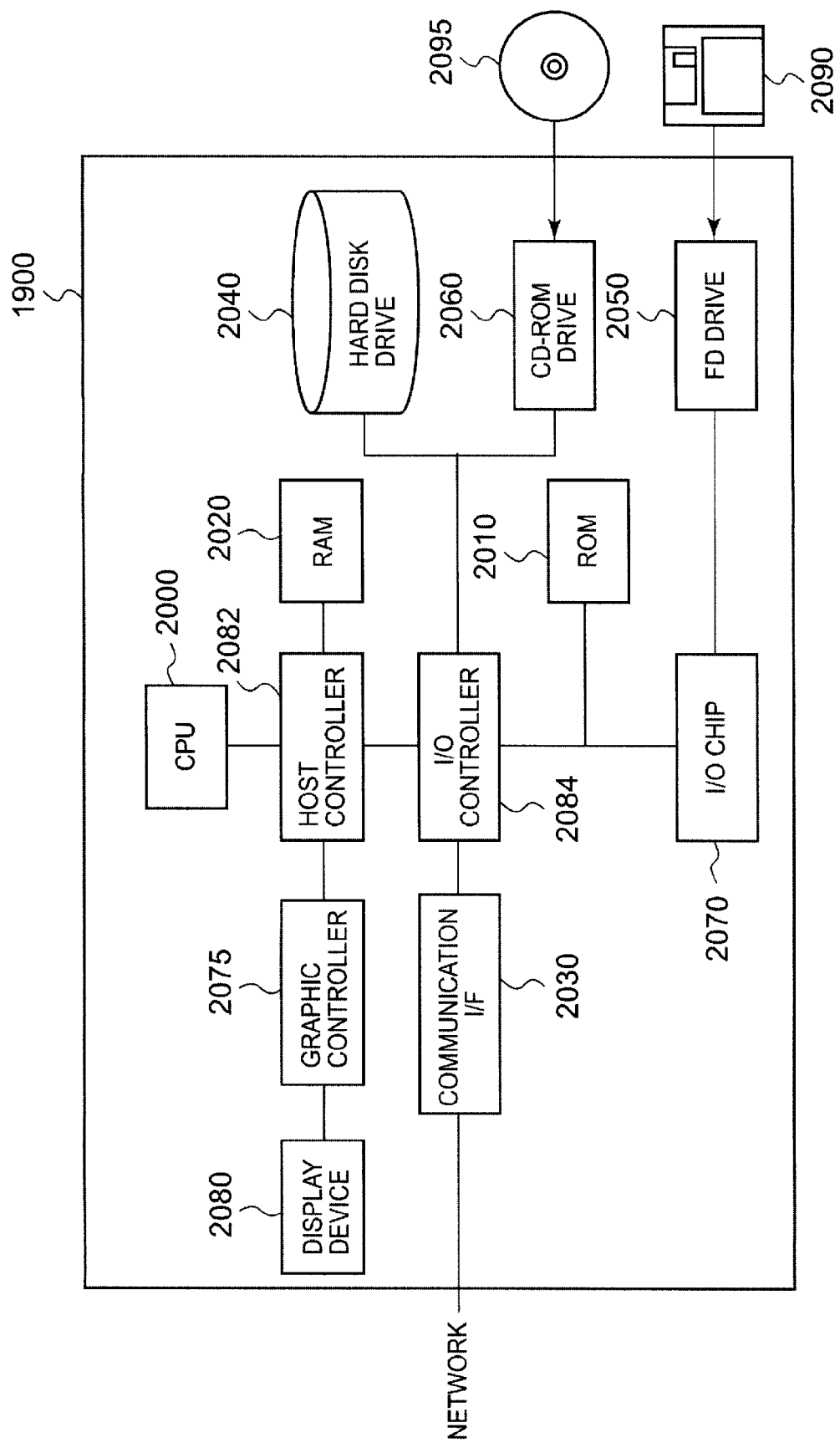
FIG. 17 shows an example of a hardware configuration of a computer according to the embodiment of the present invention.

FIG. 17 shows an example of a hardware configuration of a computer 1900 according to the embodiment. The computer 1900 according to the embodiment includes a CPU peripheral section having a CPU 2000, a RAM 2020, a graphic controller 2075, and a display device 2080 interconnected through a host controller 2082, an input/output section having a communication interface 2030, a hard disk drive 2040, and a CD-ROM drive 2060 connected to the host controller 2082 through the input/output controller 2084, and a legacy input/output section having a ROM 2010, a flexible disk drive 2050, and an input/output chip 2070 connected to the input/output controller 2084.

The host controller 2082 connects the RAM 2020, the CPU 2000 accessing the RAM 2020 at a high transfer rate, and the graphic controller 2075. The CPU 2000 operates based on a program stored in the ROM 2010 and the RAM 2020 to control each section. The graphic controller 2075 acquires image data generated by the CPU 2000 and the like on a frame buffer provided in the RAM 2020 to display the image data on the display device 2080. Instead, the graphic controller 2075 can incorporate the frame buffer for storing the image data generated by the CPU 2000, for example.

The input/output controller 2084 connects the host controller 2082, the communication interface 2030 as a relatively high-speed I/O device, the hard disk drive 2040, and the CD-ROM drive 2060. The communication interface 2030 communicates with other devices through a network. The hard disk drive 2040 stores a program or programs and data used by the CPU 2000 within the computer 1900. The CD-ROM drive 2060 reads the program or data from a CD-ROM 2095 to provide it to the hard disk drive 2040 through the RAM 2020.

Further, relatively low-speed I/O devices such as the ROM 2010, the flexible disk drive 2050, and the input/output chip 2070 are connected to the input/output controller 2084. The ROM 2010 stores a boot program executed upon boot-up of the computer 1900, and/or programs and the like depending on the hardware of the computer 1900. The flexible disk drive 2050 reads a program or data from a flexible disk 2090 to provide it to the hard disk drive 2040 through the RAM 2020. The input/output chip 2070 connects not only the flexible disk drive 2050 to the input/output controller 2084, but also various I/O devices to the input/output controller 2084 through, for example, a parallel port, a serial port, a keyboard port, a mouse port, etc.

The program provided to the hard disk drive 2040 through the RAM 2020 is provided by the user in the form of a recording medium, such as the flexible disk 2090, the CD-ROM 2095, an IC card, and the like. The program is read from the recording medium, installed onto the hard disk drive 2040 within the computer 1900 through the RAM 2020, and executed by the CPU 2000.

The program installed onto the computer 1900 to allow the computer 1900 to function as the interactive voice data processing system 20 includes a recording module, a first variation calculating module, a second variation calculating module, a difference calculating module, smoothing module, and classification module. These programs or modules enable the CPU 2000 and the like to allow the computer 1900 to function as the recorder 22, the first variation calculator 24, the second variation calculator 26, the difference calculator 28, the smoother 30, and the classifier 32, respectively.

Information described in these programs is read into the computer 1900 to function as the recorder 22, the first variation calculator 24, the second variation calculator 26, the difference calculator 28, the smoother 30, and the classifier 32 as specific means in which software and the above-mentioned various hardware resources work together. Then, these specific means realize calculation or processing information according to the intended purpose of the computer 1900 in the embodiment to build the interactive voice data processing system 20 specific to the intended purpose.

As an example, when the computer 1900 communicates with an external device or the like, the CPU 2000 executes a communication program loaded on the RAM 2020 to instruct the communication processing to the communication interface 2030 based on the processing content described in the communication program. Under control of the CPU 2000, the communication interface 2030 reads transmission data stored in a sending buffer area provided in a storage device such as the RAM 2020, the hard disk drive 2040, the flexible disk 2090, or the CD-ROM 2095, to send it to the network, or writes the received data received from the network to a receiving buffer area provided in the storage device. Thus, the communication interface 2030 can transfer sent/received data from the storage device by a DMA (Direct Memory Access) system. Instead, the sent/received data can be transferred so that the CPU 2000 reads data from the storage device or the communication interface 2030 as a transfer source, or writes the data to the communication interface 2030 or the storage device as a transfer destination.

Further, the CPU 2000 instructs the reading of all or necessary parts into the RAM 2020 by DMA transfer or the like from files or database stored in an external storage device such as the hard disk drive 2040, the CD-ROM drive 2060 (CD-ROM 2095), the flexible disk drive 2050 (flexible disk 2090), etc. to perform various processing on data in the RAM 2020. Then, the CPU 2000 writes the processed data back to the external storage device by the DMA transfer. In this processing, the RAM 2020 can be considered storage for temporarily holding the content of the external storage device. Therefore, in the embodiment, the RAM 2020, the external storage device, and the like are generically referred to as a "memory," "storage section," or "storage device." Various kinds of information such as program, data, table, and database in the embodiment are stored in such a storage device as a target of the information processing. Note that the CPU 2000 can hold part of the RAM 2020 in a cache memory to read/write it on the cache memory. Even in this embodiment, since the cache memory is part of the function of the RAM 2020, the cache memory in the embodiment is included in the RAM 2020, the memory, and/or the storage device unless otherwise specified.

Further, the CPU 2000 executes, on the data read from the RAM 2020, various processing including various calculations, information processing, condition determinations, information search/replacement, etc. specified by a command string of the program and described in the embodiment. Then, the CPU 2000 writes them back to the RAM 2020. For example, when the CPU 2000 determines a condition, various variables shown in the embodiment are compared with other variables or constant numbers to determine whether they meet conditions such as larger than, smaller than, no less than, no more than, equal to, etc. If the conditions are established (or not established), the processing branches to a different command string, or a sub-routine is called.

Further, the CPU 2000 can search information stored in a file or a database within the storage device. For example, if a plurality of entries are stored in the storage device in such a manner that the attribute value of a second attribute corresponds to the attribute value of a first attribute, the CPU 2000 searches for an entry that matches a condition under which the attribute value of the first attribute is specified from the plurality of entries stored in the storage device, and reads the attribute value of the second attribute stored in the entry to be able to obtain the attribute value of the second attribute corresponding to the first attribute that meets a predetermined condition.

The above-mentioned program or module can be stored on an external recording medium. As the recording medium, in addition to the flexible disk 2090 and CD-ROM 2095, an optical recording medium such as DVD or CD, a magneto-optical recording medium such as MD, a tape medium, a semiconductor memory such as IC card, etc. can be employed. Further, the storage device such as the hard disk or the RAM provided in a server system connected to a dedicated communication network or the Internet can be used as the recording medium to provide the program through the network to the computer 1900.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A system for processing voice data in a conversation between two persons, comprising:
    a first variation calculator for calculating a variation of a speech ratio of a first speaker from the voice data in the conversation between the two persons;
    a second variation calculator for calculating a variation of a speech ratio of a second speaker from the voice data in the conversation between the two persons;
    a difference calculator for calculating a difference data string representing a variation of the difference between the speech ratio of the first speaker and the speech ratio of the second speaker;
    a smoother for generating a smoothed difference data string by smoothing the difference data string; and
    a presenter for presenting the variation of the difference between the speech ratio of the first speaker and the speech ratio of the second speaker using the smoothed difference data string.

2. The system according to claim 1, wherein the presenter includes a classifier for classifying the conversation between the first speaker and the second speaker based on the smoothed difference data string in order to output a classification result.

3. The system according to claim 2, wherein the classifier groups conversations that have a similar pattern of the smoothed difference data string to classify a plurality of conversations.

4. The system according to claim 3, wherein the classifier converts the smoothed difference data string to a classification data string representing the variation of values for identifying when the first speaker predominantly speaks, when the second speaker predominantly speaks, or when the first speaker and the second speaker both speak, in order to classify the plurality of conversations based on the pattern of the classification data string.

5. The system according to claim 4, wherein the classifier replaces a pattern in which a sequence of equal values occur in the classification data string with a pattern in which the number of the equal values is one.

6. The system according to claim 2, wherein
    the first variation calculator calculates the variation of the speech ratio of the first speaker from the voice data representing the voice of the first speaker in a conversation in which the first speaker and the second speaker speak by phone, and
    the second variation calculator calculates the variation of the speech ratio of the second speaker from the voice data representing the voice of the second speaker in a conversation in which the first speaker and the second speaker speak by phone.

7. The system according to claim 6, wherein the classifier classifies a conversation between the first speaker and the second speaker based on the smoothed difference data string from which at least one of a start portion and an end portion in the conversation between the two persons is removed.

8. The system according to claim 6, further comprising a recorder for recording for each conversation, voice data representing the voices of the first speaker and the second speaker, wherein
    the classifier extracts the smoothed difference data string that matches a target pattern to be extracted to replay from the recorder, the voice data in a conversation corresponding to an extracted smoothed difference data string.

9. The system according to claim 8, wherein the classifier changes the target pattern according to whether the first speaker initiates a call or the second speaker initiates a call.

10. The system according to claim 2, wherein the classifier calculates a variation of values representing when the first speaker or the second speaker predominantly speaks in the conversation according to the rate of change in data of the smoothed difference data string.

11. The system according to claim 2, wherein the classifier groups conversations that have similar patterns of the smoothed difference data string in order to display a plurality of conversations for each group, wherein conversations included in at least one group are displayed in chronological order.

12. The system according to claim 2, wherein the classifier classifies the plurality of conversations for the first speaker to display the plurality of classified conversations for the first speaker.

13. A method of processing voice data in a conversation between two persons to determine characteristic conversation patterns, the method comprising the steps of:
    calculating a variation of a speech ratio of a first speaker from the voice data in the conversation between the two persons;
    calculating a variation of a speech ratio of a second speaker from the voice data in the conversation between the two persons;
    calculating a difference data string representing a variation of the difference between the speech ratio of the first speaker and the speech ratio of the second speaker;
    generating a smoothed difference data string; and
    grouping the conversations according to the patterns of the smoothed difference data strings.

14. A computer readable article of manufacture tangibly embodying computer readable instructions for executing a computer implemented method of processing voice data in a conversation between two persons to determine characteristic conversation patterns, the method comprising the steps of:
    calculating a variation of a speech ratio of a first speaker from the voice data in the conversation between the two persons;
    calculating a variation of a speech ratio of a second speaker from the voice data in the conversation between the two persons;
    calculating a difference data string representing a variation of the difference between the speech ratio of the first speaker and the speech ratio of the second speaker;
    generating a smoothed difference data string; and
    grouping the conversations according to the patterns of the smoothed difference data strings.

* * * * *